United States Patent

Haraszti

[15] 3,684,903

[45] Aug. 15, 1972

[54] DYNAMIC CIRCUIT ARRANGEMENTS

[72] Inventor: Tegze Haraszti, Rollwagstr. 4, 71 Heilbronn, Germany

[22] Filed: July 21, 1970

[21] Appl. No.: 56,842

[30] Foreign Application Priority Data

July 29, 1969 Germany..........P 19 38 468.0

[52] U.S. Cl. ...................307/304, 307/279, 307/251

[51] Int. Cl. ............................................H03k 19/08

[58] Field of Search..307/205, 251, 279, 304, 221 C, 307/292; 317/235

[56] References Cited

UNITED STATES PATENTS

| | | | |
|---|---|---|---|
| 3,421,092 | 1/1969 | Bower et al. | 307/221 C |
| 3,292,008 | 12/1966 | Rapp | 307/251 |
| 3,309,534 | 3/1967 | Yu et al. | 307/304 |
| 3,493,786 | 2/1970 | Ahrons et al. | 307/279 |
| 3,497,715 | 2/1970 | Yen | 307/304 |
| 3,521,242 | 7/1970 | Katz | 307/279 |
| 3,523,284 | 8/1970 | Washizuka et al. | 307/221 C |
| 3,435,257 | 3/1969 | Lawrie, Jr. | 307/292 |
| 3,505,573 | 4/1970 | Wiedmann | 307/279 |

OTHER PUBLICATIONS

Short " MOS FET Shift Register Element" Vol. 9 No. 8 Jan. 67 IBM Tehcnical Disclosure Bulletin Pages 1047- 1049.

Millman & Taub " Pulse, Digital & Switching Wave Forms" 1965 McGraw-Hill Pages 343- 344.

Boysel & Murphy " Multiphase Clocking Achieves 100-Nsed MOS Memory" Electronic Design News June 10, 1968 Pages 50- 55.

Sidorsky " MTOS Shift Registers" Application notes 7 pages, General Instrument Corp. December 67.

Atwood " Field Effect Transistor Circuits" Vol. 6 No. 9 February 64 IBM Technical Disclosure Bulletin Pages 91, 92 and 93.

*Primary Examiner*—Donald D. Forrer
*Assistant Examiner*—R. E. Hart
*Attorney*—Spencer and Kaye

[57] ABSTRACT

A dynamic circuit arrangement which is operable by clock pulses, particularly a storage element or a shift register stage, and which comprises at least two capacitances, each capacitance having a charging circuit comprising a diode and a discharge circuit comprising two insulated gate or MOS field effect transistor whose controllable current paths are connected in series, in which the charging circuit of each capacitance is connected in series with the discharge circuit associated with the same capacitance.

16 Claims, 5 Drawing Figures

Inventor:
Tegze Haraszti

BY Spencer & Kaye
ATTORNEYS.

DYNAMIC CIRCUIT ARRANGEMENTS

BACKGROUND OF THE INVENTION

The invention relates to a dynamic circuit arrangement, particularly a storage element or a shift-register stage, having at least two capacitances, each of which has a charging circuit and a discharge circuit associated with it.

SUMMARY OF THE INVENTION

The object of the invention is to provide a dynamic circuit arrangement operable by clock pulses and consisting essentially of at least two capacitances, each capacitance having a charging circuit comprising a diode and a discharge circuit comprising at least two active circuit elements having controllable current paths connected in series, the charging circuit of each capacitance being connected in series with the discharge circuit associated with the same capacitance.

A barrier-layer diode with a p-n junction or a Schottly diode with a metal-semiconductor junction is preferably selected as a diode. The active circuit elements may consist of transistors, preferably of MOS field effect transistors.

The circuit arrangement according to the invention is particularly suitable for the storage of digital information and is used, in particular, in computers.

In the circuit arrangement according to the invention, the capacitances are each preferably formed by the input or output capacitance of one or more active circuit elements which again are in turn part of a discharge circuit associated with a capacitance.

Since the charging circuit in the circuit arrangement according to the invention is formed by a diode which has a low forward resistance, the variation in the state of charge at the capacitances is possible considerably more quickly with it than if the semiconductor circuit were built up exclusively from MOS field effect transistors. This is to be attributed to the fact that the controlled current path of MOS field effect transistors has a relatively high resistance in comparison with the forward resistance of barrier-layer or Schottky diodes. In addition, as a result of the low voltage drop at the diode, the effect is achieved that the control voltage at an MOS field effect transistor connected into a discharge circuit is only slightly below the pulse voltage of the phase clock pulses necessary for the operation of the semiconductor circuit. As a result of this, the forward resistance of the controlled MOS field effect transistor is reduced to the minimum possible value and hence the discharge time constant of the capacitance associated with the discharge circuit is reduced.

A further advantage of the circuit arrangement according to the invention lies in the extremely low power consumption during operation. This is attributable to the fact that the circuit only consumes power during the recharging or charging of the storage capacitances associated with the active components, and the ohmic losses are kept very low. Since the state of charge of the capacitances is constantly renewed by phase clock pulses repeated cyclically, information once impressed in a storage element for example is retained for an unlimited length of time.

Different variations are possible for the allocation of the phase clock pulses in time, depending on the problem to be solved by a circuit and its specific construction.

As already stated, MOS field effect transistors with an insulated control electrode are preferably provided as active components. In this case, the insulating layer generally consists of the oxide of the semiconductor material. MOS transistors generally consist of a basic semiconductor body of the first type of conductivity into which regions of a second type of conductivity are introduced from one surface, with specific spacing. The surface area of the first type of conductivity between the two said regions is covered with an insulating layer on which the control electrode is mounted. An electrode, which is generally termed "drain electrode" or "source electrode" respectively is connected to each of the two regions of the second type of conductivity. In such semiconductor devices, the current path controlled by the insulated control electrode is situated between the "drain electrode" and the "source electrode." Said MOS transistors generally consist of monocrystalline silicone while the insulating material present between the control electrode and the semiconductor surface consists of silicon dioxide in this case.

During the processing of digital information by means of circuit arrangements according to the invention, a logical zero preferably corresponds to zero potential while a negative potential is used to realize a logical 1.

BRIEF DESCRIPTION OF THE DRAWINGS

The invention will now be further described, by way of example, with reference to the accompanying drawings, in which.

DESCRIPTION OF PREFERRED EMBODIMENTS

Figures 1, 2, 3, 4, 5:
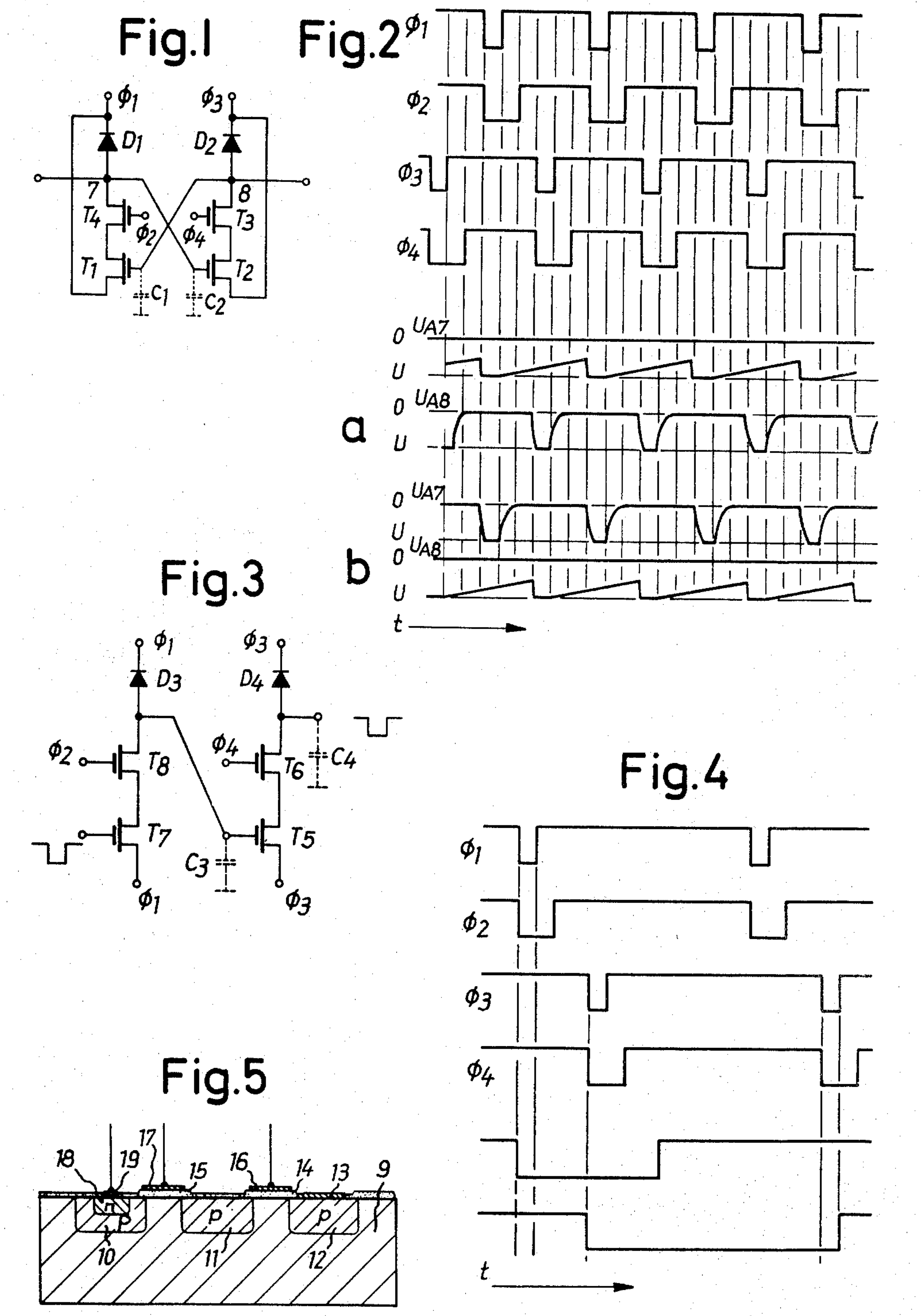
FIG. 1 shows an example of a circuit arrangement of a storage element according to the invention.
FIG. 2 shows the allocation in time of phase clock pulses for the operation of the storage element illustrated in FIG. 1 and the potential conditions which develop at the storage capacitances.
FIG. 3 shows an example of a circuit arrangement of a shift register stage, according to the invention.
FIG. 4 shows the allocation in time of phase clock pulses for the operation of the shift register stage shown in FIG. 3 and the input quantity and the output quantity.
FIG. 5 shows a possible embodiment of a series connection of a charging circuit and a discharge circuit according to the invention.

The circuit of a storage element as shown in FIG. 1 consists of four MOS field effect transistors $T_1$ to $T_4$, with each of which there is connected in series the controlled current paths of two transistors $T_1$ and $T_4$ or $T_2$ and $T_3$. A diode $D_1$ or $D_2$ is connected in series with each series connection consisting of two transistors. The storage capacitances of the storage elements are formed by the input capacitances $C_1$ and $C_2$ of the transistors $T_1$ and $T_2$. The transistors $T_1$ and $T_2$ forming the storage capacitances must be connected to one another so that the discharge circuit of the input capacitance of the one transistor leads through the controllable current path of the other transistor. This is achieved by the fact that the charging circuit of the one capacitance is connected in series with the discharge circuit for the same capacitance, and that the junction between said charging and discharge circuits is connected to the control electrode of that transistor, the input capacitance of which is allocated to said charging and discharging circuit. Thus in FIG. 1, the diode $D_1$ and the controlled current paths of the MOS transistors $T_1$ and $T_4$ connected in series with the diode form the charging circuit and the discharge circuit for the capacitance $C_2$ which is formed by the input capacitance of the transistor $T_2$.

This last-mentioned transistor $T_2$ is in turn connected in series with the transistor $T_3$ and the diode $D_2$, and this series connection forms the charging and discharge circuit for the capacitance $C_1$ which consists of the input capacitance of the transistor $T_1$. The junctions 7 and 8 respectively between the charging and discharge circuits are connected to the control electrode of the transistor, the input capacitance $C_1$ or $C_2$ of which is allocated to the particular series connection of charging and discharge circuit. In this manner, a completely symmetrical circuit is obtained wherein the junctions between the charging and discharge circuits serve as signal outputs at which the potentials appearing at the capacitances are taken off as an output signal.

The diodes are preferably connected in series with the controllable current paths of the transistors forming a discharge circuit so that, when a negative voltage pulse is applied to the free electrode of the diode, this is conducting. This is necessary because the phase clock pulses used preferably have negative potential.

The free electrode of each diode $D_1$ or $D_2$ is connected to the electrode which is still free of the transistor $T_1$ or $T_2$ forming a capacitance $C_1$ or $C_2$ and connected in series with the diode. In each case, this junction and the control electrode of the further transistor $T_3$ or $T_4$ connected between each diode and the capacitance-forming transistor is connected to a pulse source supplying phase clock pulses. The phase clock pulses delivered by the pulse sources are staggered in time so that first the charging circuit and then the discharge circuit becomes effective for one capacitance. Only after the discharge circuit of one capacitance has been opened again can the charging circuit and the discharge circuit of the other capacitance become effective in succession.

In FIG. 2, the correlation in time of the phase clock pulses $\phi_1$ to $\phi_4$ is illustrated. The phase clock pulse $\phi_1$ is applied to the junction between the diode $D_1$ and the transistor $T_1$ while the phase clock pulse $\phi_2$ appears at the control electrode of the transistor $T_4$. The phase clock pulse $\phi_3$ appears at the junction between the diode $D_2$ and the transistor $T_2$, and the phase clock pulse $\phi_4$ at the control electrode of the transistor $T_3$. As can be seen from FIG. 2, the phase clock pulses $\phi_1$ and $\phi_2$ or $\phi_3$ and $\phi_4$ begin to charge and discharge one and the same capacitance, each at the same moments, as a result of which a particularly simple construction is rendered possible for the generator delivering the clock pulses. The phase clock pulses $\phi_2$ and $\phi_4$ controlling the discharge circuits end at a later moment, however, than the pulses which cause the charging of the capacitances.

The voltages $U_{A7}$ and $U_{A8}$ are taken off, as output signals, from the storage element shown, between the junction points 7 and 8 and the neutral point of the circuit, and are identical to the voltages which are connected to the storage capacitances $C_1$ and $C_2$ effective in parallel with the control sections of the transistors $T_1$ and $T_2$.

In FIG. 2, the behavior of the output voltages $U_{A7}$ and $U_{A8}$ in time is represented, under the points a and b, for the two possible operating states of the storage element. When the storage element is in the switching state assumed for the case a, the capacitance $C_2$ is in the charged state and the capacitance $C_1$ is discharged. On the appearance of the phase clock pulse $\phi_1$, the capacitance $C_2$, which is actually charged, but the potential of which has decreased during the preceding pulse interval as a result of leakage currents, is charged to its maximum value again through the conducting diode $D_1$. Even after the pulse $\phi_1$ is at an end, but while the pulse $\phi_2$ is still in existence, no discharge of the capacitance $C_2$ is possible across the conducting transistor $T_4$ because the transistor $T_1$, at the control electrode of which there is zero potential, remains cut off.

On the appearance of $\phi_3$, the capacitance $C_1$ is charged from earth potential substantially to the pulse potential through the conducting diode $D_1$. When the pulse $\phi_3$ is at an end but pulse $\phi_4$ is still continuing, the capacitance $C_1$ is immediately discharged to zero potential again through the conducting transistor $T_3$ and the transistor $T_4$ which is likewise conducting. Since the potential appearing at the control electrodes of the transistors $T_1$ and $T_2$ is only reduced by the voltage drop at the extremely low forward resistance of the diode, the charging and discharge periods are very short.

In the switching state assumed for the case b, the capacitance $C_1$ is charged and the capacitance $C_2$ is discharged. As is clear from the voltage $U_{A7}$ for this case, the capacitor $C_2$ is at first charged, on the appearance of the phase clock pulses $\phi_1$ and $\phi_2$, and immediately discharged again, while the capacitance $C_1$ is charged to its maximum possible value by the pulse $\phi_3$ and hence leakage losses are compensated again during the pulse interval. The capacitance $C_1$ remains fully charged even after the termination of the pulse $\phi_3$ and during the continuation of $\phi_4$. As will be seen, the information once written is constantly retained during the clock-pulse operation of the storage element. The output signals $U_{A7}$ and $U_{A8}$ remain ambiguous from the beginning of each phase clock pulse which causes the charging of a storage capacitance at least until the moment when the discharge circuit of this capacitance becomes effective. During this period, both capacitances are in the charged state. In order to avoid misinterpretation of the stored information, it is therefore adviseable to couple the read-out process to the clock pulses so that the stored information is only extracted after the clock pulses which control the discharge circuits of the storage capacitances.

A shift register stage is illustrated in FIG. 3. The circuit consists, like that in FIG. 1, of four MOS field effect transistors $T_5$ to $T_8$, wherein the controlled current paths of two transistors at a time $T_5$ and $T_6$ or $T_7$ and $T_8$ are again connected in series. A diode $D_3$ or $D_4$ is connected in series with each series connection consisting of two transistors. A first capacitance $C_3$ is formed by the input capacitance of a first transistor $T_5$ while the second capacitance $C_4$ is formed by the output capacitance of the second transistor $T_6$ connected in series with the first transistor $T_5$. The voltage at this output capacitance $C_4$ delivers the output signal for the shift register stage. This discharge circuit of the second capacitance $C_4$ consists, in the circuit illustrated in FIG. 3, of the two capacitance-determining transistors $T_5$ and $T_6$.

In contrast to the storage element illustrated in FIG. 1, in the shift register stage only the control electrode of the first transistor $T_5$, serving as a first capacitance $C_3$, is connected to the junction between a charging circuit and a discharge circuit connected in series with the charging circuit. This charging and discharge circuit composed of the transistors $T_7$ and $T_8$ and the diode $D_3$ is allocated to the first capacitance $C_3$ and serves to charge and discharge it.

In shift register stages, an input signal appears, with a certain delay in time, at the output electrode of the circuit again. In the circuit illustrated in FIG. 3, the input signal is applied to the control electrode at the transistor $T_7$ or $T_8$.

The phase clock pulses $\phi_1$ to $\phi_4$ have the same correlation in time as in the circuit shown in FIG. 1 and appear at the same electrodes of the circuit elements. In FIG. 4, the correlation in time between the phase clock pulses $\phi_1$ to $\phi_4$ and the position in time of an input pulse and of a resulting output pulse are illustrated.

Let it be assumed that an input signal begins before the first phase clock pulse $\phi_1$ and ends after the last phase clock pulse $\phi_4$ in the same pulse series. On the appearance of $\phi_1$, the capacitance $C_3$ of the transistor $T_5$ is charged to a potential which corresponds to the pulse potential reduced by the diffusion voltage of the diode $D_3$. After $\phi_1$ is at an end but while $\phi_2$ is still continuing, the capacitance $C_3$ is discharged again, during the phase clock pulse of $\phi_2$, across the conducting transistor $T_8$ and the conducting transistor $T_7$, to the input electrode of which there is applied the input signal. For the duration of the phase clock pulse, the capacitance $C_4$ is without charge. When the pulse $\phi_3$ begins, however, this capacitance $C_4$ is charged through the diode $D_4$. Thus a change in potential occurs at the output electrode for the first time at the beginning of the pulse $\phi_4$ because the capacitance is charged to a negative potential. The potential at $C_4$ is again only reduced by the voltage drop at the diode $D_4$ in comparison with a pulse voltage of $\phi_3$ to $\phi_4$. When $\phi_3$ is at an end while $\phi_4$ is still continuing, no discharge of the capacitance $C_4$ is possible because the transistor $T_5$ remains cut off and the diode $D_4$ is likewise blocked. The potential at $C_4$ is therefore retained until a discharge of the capacitance $C_4$ takes place on the appearance of the clock pulse $\phi_4$ in the next pulse series, assuming that the input pulse is then at an end. This is attributable to the fact that in the absence of an input signal on the appearance of $\phi_1$, although $C_3$ is charged, discharging after the end of $\phi_1$ is no longer possible because the transistor $T_7$ remains cut off. It is true that if $\phi_3$ is applied to the circuit, the capacitance $C_4$ is retained at its original state of charge, leakage losses occurring in the pulse interval of $\phi_3$ being compensated for. As soon as the pulse $\phi_3$ is at an end, however, and while $\phi_4$ is still continuing, the capacitance $C_4$ is completely discharged through the two transistors $T_5$ and $T_6$ which are now conducting.

In the shift register stage according to the invention, the clock pulses appearing at the free electrodes of the circuit elements are again so selected that the charging and the discharge circuit at each capacitance are effective at different moments.

The circuit arrangement according to the invention is excellently suited for construction in the form of an integrated solid-state circuit. All MOS field effect transistors and the barrier-layer or Schottky diodes can be accommodated in a simple manner in a single semiconductor body.

Such a semiconductor device composed of a charging circuit and a discharge circuit is illustrated for example in FIG. 5. In order to realize two field effect transistors and one diode, the controlled current paths of the MOS transistors and the diode being connected in series, three regions 10, 11 and 12 of p-type conductivity, which are insulated from one another at the semiconductor surface by areas of the basic semiconductor body of n-type conductivity, are introduced into a basic semiconductor body 9 of n-type conductivity for example, from one major surface. A further region 18 of n-type conductivity is introduced into one of these regions, for example the region 10, in order to realize a barrier-layer diode. The regions of n-type conductivity situated between the regions 10 and 11 or 11 and 12 form the controlled current paths of the two field effect transistors. The surface regions of n-type conductivity are therefore covered with a suitable oxide layer 15 04 14 respectively on each of which there is provided a respective control electrode 17 or 16. The region 12 of P-type conductivity is connected to a further electrode 13 while an electrical connection is unnecessary for the region 11, as can be seen from the circuit FIGS. 1 or 3. The region 18 of n-type conductivity of the diode is provided with a metal electrode 19. All the other parts of the semiconductor surface are preferably covered with an oxide layer or another insulating layer.

The dimensions of the circuit arrangement according to the invention are very small and only require wiring which is very easy to produce. The sensitivity of the circuit arrangements is very low since, because of the low forward resistances of the diodes used, the zero levels correspond almost completely to earth potential and the potential level corresponding to a logical 1 corresponds substantially to the pulse potential of the phase clock pulses. The necessary diodes can also be constructed very easily from Schottky diodes with a metal-semiconductor junction. Such Schottky diodes are very rapid switching elements, are simple to manufacture, and have extremely small space requirements.

It will be understood that the above description of the present invention is susceptible to various modifications changes and adaptations.

What is claimed is:

1. A four-phase electrical dynamic storage element comprising: two controllable components controllable into a conducting or cut-off state in phase opposition; a pair of storage capacitances, each of said storage capacitances lying in parallel with the control path of a different one of said two controllable components and controlling the state of its associated controllable component, a separate charging and a separate discharging circuit for each said capacitance, the discharging circuit of each capacitance consisting of the series connection of the current path of the controllable component associated with the other said pair of capacitances and the current path of a further controllable component which forms a gate, and the charging circuit of each capacitance consisting of a barrier-layer diode whose current path is connected in series with the discharging circuit of the associated capacitance; and generator means for supplying cyclically repeated four-phase clock pulses separately to the control inputs of said further controllable components and to one electrode of each of said barrier-layer diodes for causing charging of both said storage capacitances and thereafter discharging of one of said storage capacitances depending on its previous state of charge, the other electrode of each of said barrier-layer diodes being coupled to a respective one of said capacitances for supplying respective clock pulses from said generator means to the associated capacitance as the charging voltage.

2. A circuit arrangement as claimed in claim 1, in which each of said two controllable components is a respective insulated gate field effect transistor and each said capacitance is formed by the input capacitance of one of said field effect transistors which comprises a respective portion of one of said discharging circuits.

3. A circuit arrangement as claimed in claim 1, in which each of said barrier-layer diodes is a barrier-layer diode with a p-n junction.

4. A circuit arrangement as claimed in claim 1, in which each of said barrier-layer diodes is a Schottky diode.

5. A circuit arrangement as claimed in claim 1 in which said further controllable components are field effect transistors which are changed over from a cut-off to a conducting state, at least partially, by two phases of the repeated clock pulses supplied to their control inputs.

6. A circuit arrangement as claimed in claim 5, in which the clock pulses are so selected that the charging and discharging circuits of each said capacitance are effective at different times.

7. A circuit arrangement as claimed in claim 5, in which the clock pulses are staggered in time so that one capacitance first becomes effective for its charging circuit and then for its discharging circuit and that only after the discharging circuit of said one capacitance has has been opened again do the charging and discharging circuits of the other capacitance become effective in succession.

8. A circuit arrangement as claimed in claim 1, in which each of said two controllable components is a respective insulated gate field effect transistor and each of said capacitances is formed by the input capacitance of one of said transistors, said transistors being connected to one another so that the discharging circuit of the input capacitance of one transistor leads through the controllable current path of the other transistor whose input capacitance forms one of said capacitances.

9. A circuit arrangement as claimed in claim 8, in which the junction between said charging circuit and discharging circuit of each of said capacitances is connected to the control electrode of said one transistor of the other capacitance, said junctions serving as signal outputs at which the potentials appearing at the capacitances are taken off as an output signal.

10. A circuit arrangement as claimed in claim 8, in which each of said further controllable components is a respective further insulated gate field effect transistor and wherein the free electrode of each diode is connected to an electrode of the associated one of said transistors forming the capacitances and which is connected in series with the respective diode and one of said further transistors, this connection and the control electrode of each said further transistor of the discharge circuit for each capacitance being connected to said generator means.

11. A circuit arrangement as claimed in claim 1, in which said arrangement takes the form of an integrated solid-state circuit.

12. A circuit arrangement as claimed in claim 11, in which all of said diodes and said components are accommodated in a single semiconductor body.

13. A circuit arrangement as defined in claim 12 wherein each of said charging and discharging circuits comprises: a body of semiconductor material of a first conductivity type; first, second and third spaced regions of the opposite conductivity type formed within said body and extending to a single major surface thereof; a fourth region of said first conductivity type formed within said first region and extending to said major surface; a layer of insulating material overlying at least the portions of said semiconductor body which extend to said major surface between said first, second and third regions; first and second metal control electrode layers formed on the surface of said insulating layer and overlying said portions of said body which extend to said surface between said first and second regions and between said second and third regions respectively; and separate electrical contacts for said third and fourth regions whereby said first and fourth regions form a diode, said first and second regions form the source and drain of a first insulated gate field effect transistor and said second and third regions form the source and drain of a second insulated gate field effect transistor with said diode and said first and second transistors all being connected in series.

14. A circuit arrangement as claimed in claim 5 wherein said further controllable components are insulated gate field effect transistors.

15. A circuit arrangement as claimed in claim 1 wherein each of said two controllable components and each of said further controllable components are insulated gate field effective transistors.

16. A circuit arrangement as claimed in claim 1 wherein said two controllable components are respectively a first insulated gate field effect transistor and a second insulated gate field effect transistor; said further controllable components are respectively a third insulated gate field effect transistor and a further insulated gate field effect transistor; the gate electrode of said second field effect transistor is connected to one electrode of one of said diodes which has its other electrode connected to said generator means for receiving clock pulses of the first phase; the gate electrode of said first field effect transistor is connected to one electrode of the other of said diodes which has its other electrode connected to said generator means for receiving clock pulses of the third phase; the gate electrodes of said third and said fourth transistors are connected to said generator means for receiving respectively clock pulses of the second phase and the fourth phase; the first and third field effect transistors are connected in series with one another and said one diode; the second and fourth transistors are connected in series with one another and said other diode; one current carrying electrode of said first field effect transistor is connected to said generator means for receiving clock pulses of the first phase, its other current carrying electrode being connected to a current carrying electrode of said third field effect transistor; and one current carrying electrode of said second field effect transistor is connected to said generator means for receiving clock pulses of the third phase, its other current carrying electrode being connected to a current carrying electrode of said fourth field effect transistor.

* * * * *

Disclaimer 3,684,903.—*Tegze Haraszti*, Heilbronn, Germany. DYNAMIC CIRCUIT ARRANGEMENTS. Patent dated Aug. 15, 1972. Disclaimer filed Oct. 31, 1972, by the assignee, *Licentia, Patent-Verwaltungs-G.m.b.H.*

Hereby disclaims the portion of the term of the patent subsequent to Aug. 8, 1989.

[*Official Gazette January 30, 1973.*]